May 12, 1942.  H. P. MURPHY  2,282,979
COUNTER-ELECTROMOTIVE FORCE CELL
Filed Nov. 24, 1939
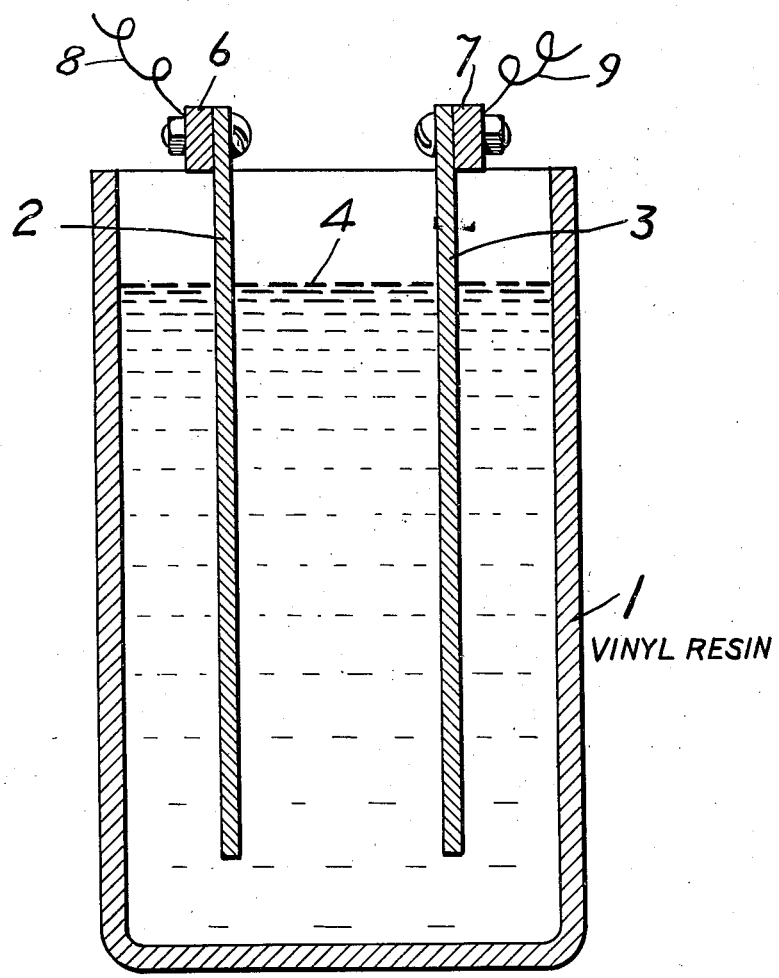
INVENTOR
Harold P. Murphy
BY
Augustus B. Stoughton
ATTORNEY.
WITNESS:

Patented May 12, 1942

2,282,979

UNITED STATES PATENT OFFICE 2,282,979

COUNTERELECTROMOTIVE FORCE CELL

Harold P. Murphy, Ridley Park, Pa., assignor to The Electric Storage Battery Company, Philadelphia, Pa., a corporation of New Jersey Application November 24, 1939, Serial No. 305,925

3 Claims. (Cl. 136—6)

This invention relates to improvements in nickel-alkaline counter E. M. F. cells—that is, electrolytic cells having electrodes of nickel or nickel alloy mounted in glass jars or containers and immersed in a solution of alkaline hydroxide such as described in Patent No. 1,902,081 to Kershaw and Woodbridge. Such cells are used in direct current circuits to introduce an electromotive force in opposition to the current flow, their function being somewhat similar to that of a rheostat, but with the important difference that in the case of the rheostat the opposing voltage varies directly with the current while in the case of the counter E. M. F. cell the opposing voltage should be constant regardless of current changes. The nickel alkaline counter E. M. F. cell has therefore been extensively used where constancy of the counter E. M. F. introduced into the circuit is of importance. Examples of such use are telephone installations where constant voltage is required on the load circuit and the voltage of the source may vary due for example to the range of voltage of a storage battery between charging and discharging conditions. Furthermore, since in such installations these counter E. M. F. cells are cut in and out of circuit one at a time, usually by automatic voltage responsive means, it is important that the value of the voltage added or deducted be as low as possible, to minimize the resulting sudden change of voltage.

It has been found that in service the voltage of nickel-alkaline counter E. M. F. cells mounted in glass jars or containers heretofore used gradually increased with use, under identical conditions of current, temperature, and the like, which increase in voltage has seriously interfered with their efficiency in performing the regulating functions for which they are employed. This phenomenon has been the subject of extensive investigation and research in respect to the effect of the composition of the electrolyte and the electrodes without reaching a satisfactory solution.

I have now discovered that this gradual increase in the counter E. M. F. of these cells in service is directly connected to the composition of the jars in which they are assembled and that by the use of one of the thermo-plastic resins now available on the market, such as the vinyl resins, instead of glass, for the containers for these cells, the voltage characteristics, in respect to gradual increase in service, are markedly improved.

My invention consists in the substitution of one of the thermo-plastic resins, now available on the market, such as the vinyl resins, for glass as the material from which to make the containers for counter E. M. F. cells, and in the discovery that the substituted material shows its superiority to consist in opposition to gradual increase in counter E. M. F. of the cell in service, and to variation inter se of the counter E. M. F. of groups of cells, and in increase in efficiency of the cell in the performance of the regulating function for which the cell is employed.

As a demonstration of this result, the following test may be cited.

Four cells, assembled with identical elements—of sheet nickel plates and identical electrolyte, two in glass jars with glass bead separators and two in jars of a synthetic resin known by the trade-name "Lucite" (methyl methacrylate), and with separator beads of "Vinylite," a vinyl resin (copolymer of vinyl chloride and vinyl acetate), were connected in series and direct current passed continuously through them. After five days of such operation the two cells assembled in glass jars each showed a counter E. M. F. of 2.40 volts, while the two cells in the "Lucite" jars each showed a counter E. M. F. of 2.21 volts. After 75 days of such operation one of the cells in glass showed a counter E. M. F. of 2.72 and the other a counter E. M. F. of 2.90 volts, while the two cells in "Lucite" jars showed identical readings of 2.45 volts. Thus the cells assembled with vinyl resin instead of glass showed not only a much lower counter E. M. F. but an absolutely uniform E. M. F. as compared with the higher E. M. F. and wide variation between individual cells when assembled in glass. Similar tests with other synthetic resins of the vinyl group, such as "Polystyrene," have given similar results, demonstrating that as a class, those synthetic resins which possess the other desirable physical characteristics such as rigidity, resistance to deformation at elevated temperature, transparency, and facility of fabrication, well understood by those skilled in the art, will show the same advantages in this service. By vinyl resin I mean a solid, thermo-plastic saturated synthetic resin resluting from the polymerization of a compound of the vinyl group, $CH_2=CH-$.

For a further explanation of my invention, reference may be had to the accompanying drawing of which the only figure shows a counter E. M. F. cell in vertical cross-section.

More specifically, a counter E. M. F. cell of my invention comprises a container 1 of a vinyl resin. In the container 1 are mounted electrodes 2 and 3 shown as sheet metal plates of nickel and immersed in electrolyte 4 comprising a solution of an alkaline hydroxide. Plates 2 and 3 are connected to connections 6 and 7 by means of which the circuit wires 8 and 9 are attached.

I claim:

1. For a counter E. M. F. cell comprising electrodes containing metallic nickel immersed in a solution of an alkaline hydroxide, a container of rigid vinyl resin which opposes gradual increase in counter E. M. F. of the cell in service and variation inter se of the counter E. M. F. of a group of cells and increases the efficiency of the cell in the performance of the regulating function for which the cell is employed.

2. For a counter E. M. F. cell comprising electrodes containing metallic nickel immersed in a solution of an alkaline hydroxide, a container of methyl methacrylate resin which opposes gradual increase in counter E. M. F. of the cell in service and variation inter se of the counter E. M. F. of a group of cells and increases the efficiency of the cell in the performance of the regulating function for which the cell is employed.

3. For a counter E. M. F. cell comprising electrodes containing metallic nickel immersed in a solution of an alkaline hydroxide, a synthetic resin container of polystyrene which opposes gradual increase in counter E. M. F. of the cell in service and variation inter se of the counter E. M. F. of a group of cells and increases the efficiency of the cell in the performance of the regulating function for which the cell is employed.

HAROLD P. MURPHY.